United States Patent
Jang et al.

(10) Patent No.: US 10,493,857 B2
(45) Date of Patent: Dec. 3, 2019

(54) METHOD AND SYSTEM FOR CONTROLLING CHARGING DEVICE FOR VEHICLES

(71) Applicant: Hyundai Motor Company, Seoul (KR)

(72) Inventors: Hui Sung Jang, Gyeonggi-do (KR); Gi Bong Son, Gyeonggi-do (KR); Hyun Wook Seong, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 392 days.

(21) Appl. No.: 15/352,230

(22) Filed: Nov. 15, 2016

(65) Prior Publication Data
US 2017/0349056 A1  Dec. 7, 2017

(30) Foreign Application Priority Data
Jun. 7, 2016  (KR) .................. 10-2016-0070032

(51) Int. Cl.
*H02J 7/00* (2006.01)
*B60L 11/18* (2006.01)
*B60L 53/60* (2019.01)

(52) U.S. Cl.
CPC .......... *B60L 11/1838* (2013.01); *B60L 53/60* (2019.02); *H02J 7/0026* (2013.01); *H02J 7/0031* (2013.01); *H02J 2007/0039* (2013.01); *Y02T 10/7055* (2013.01)

(58) Field of Classification Search
CPC ... B60L 11/1838; H02J 7/0026; H02J 7/0031; H02J 2007/0039
USPC ....................................... 320/109
See application file for complete search history.

(56) References Cited

U.S. PATENT DOCUMENTS

| | | | | |
|---|---|---|---|---|
| 2010/0110593 A1* | 5/2010 | Kim | ........................ | H02M 1/32 361/18 |
| 2011/0101879 A1* | 5/2011 | McNay | ................ | H05B 41/382 315/247 |
| 2011/0141631 A1* | 6/2011 | Yabuzaki | ............ | H02M 1/4225 361/18 |
| 2013/0062966 A1* | 3/2013 | Verghese | ................ | H02J 7/025 307/104 |
| 2013/0193931 A1* | 8/2013 | Bornhoft | ............... | A61N 1/3787 320/160 |
| 2014/0159491 A1* | 6/2014 | Kusunose | ............... | H02J 3/383 307/52 |
| 2014/0176049 A1* | 6/2014 | Yamada | .................... | H02J 7/02 320/107 |

(Continued)

FOREIGN PATENT DOCUMENTS

JP  2013-034349 A  2/2013
KR  20-0215723 Y1  12/2000

(Continued)

*Primary Examiner* — Nathaniel R Pelton
(74) *Attorney, Agent, or Firm* — Mintz Levin Cohn Ferris Glovsky and Popeo, P.C.; Peter F. Corless (57) ABSTRACT

A method and system of controlling a charging device for vehicles are provided. The method includes sensing overcurrent in a power factor correction circuit of the charging device and turning off the power factor correction circuit upon sensing overcurrent. An output voltage of the power factor correction circuit is then increased when the number of generations of sensed overcurrent is equal to or less than a predetermined first reference value and the power factor correction circuit is turned on.

14 Claims, 3 Drawing Sheets

(56) References Cited

U.S. PATENT DOCUMENTS

| | | | | |
|---|---|---|---|---|
| 2015/0022153 A1* | 1/2015 | Bouchez | ............... | H02H 3/162 |
| | | | | 320/109 |
| 2016/0023560 A1* | 1/2016 | Yim | .................... | B60L 11/1809 |
| | | | | 320/109 |
| 2016/0243952 A1* | 8/2016 | Lasagni | .............. | H02M 1/4208 |
| 2016/0339787 A1* | 11/2016 | Jang | .................... | B60L 11/1809 |

FOREIGN PATENT DOCUMENTS

| KR | 10-2004-0003695 A | 1/2004 |
|---|---|---|
| KR | 10-2004-0003698 A | 1/2004 |
| KR | 20-0352461 Y1 | 5/2004 |
| KR | 10-0761584 B1 | 9/2007 |
| KR | 2008-0078410 A | 8/2008 |
| KR | 10-0904299 B1 | 6/2009 |
| KR | 10-2010-0048769 A | 5/2010 |
| KR | 10-2011-0103252 A | 9/2011 |
| KR | 2012-0102308 A | 9/2012 |
| KR | 10-2012-0116757 A | 10/2012 |
| KR | 101323301 B1 | 10/2013 |

\* cited by examiner

METHOD AND SYSTEM FOR CONTROLLING CHARGING DEVICE FOR VEHICLES

CROSS-REFERENCE TO RELATED APPLICATION

This application claims the priority benefit of Korean Patent Application No. 10-2016-0070032, filed on Jun. 7, 2016, in the Korean Intellectual Property Office, the disclosure of which is incorporated herein by reference.

BACKGROUND

1. Field of the Invention

The present invention relates to a method and system for controlling a charging device for vehicles, and more particularly, to a method and system for controlling a vehicle device disposed within vehicles such as hybrid vehicles based on the cause of overcurrent generation in the charging device to minimize shutdown of the charging device.

2. Description of the Related Art

Automotive industry development of on gasoline and diesel vehicles has caused an increase in air pollution due to vehicle exhaust gas. Accordingly, environmentally-friendly vehicles have been researched and develop which generate no exhaust gas. A variety of environmentally-friendly vehicles, such as hybrid vehicles, plug-in hybrid vehicles, electric vehicles and fuel cell vehicles, have been developed. Among such vehicles, plug-in hybrid vehicles and electric vehicles are charged using residential electricity and thus have a vehicle charging device provided thereto, which appropriately converts a commercial voltage into a voltage for charging a vehicle battery.

The vehicle charging device converts an alternating current (AC) voltage into a direct current (DC) voltage using a device such as electric vehicle service equipment and charges a high-voltage battery with the DC voltage. Accordingly, the vehicle charging device is affected by an external environment since the vehicle charging device uses AC voltage. In particular, AC voltage may resonate according to impedance in specific areas. Furthermore, AC voltage has a control instability factor since the AC voltage includes various harmonics and thus may disable vehicle charging.

Particularly, such factors cause generation of overcurrent in the vehicle charging device and thus, the vehicle charging device is stopped for device stability. However, to stop the charging device unconditionally, even though generation of overcurrent in the charging device may be prevented through appropriate control of the charging device in the aforementioned situation distinguished from a problem in the charging device itself, is inefficient and inconvenient for vehicle users due to frequent charging interruption.

The matters disclosed in this section are merely for enhancement of understanding of the general background of the invention and should not be taken as an acknowledgment or any form of suggestion that the matters form the related art already known to a person skilled in the art.

SUMMARY

Therefore, the present invention provides a method and system for controlling a vehicle charging device, which may diagnose the cause of overcurrent generation when overcurrent is generated in the vehicle charging device and perform control for solving the overcurrent.

In accordance with an exemplary embodiment of the present invention, the above and other objects may be accomplished by the provision of a method of controlling a charging device for vehicles that may include: sensing, by a controller, overcurrent in a power factor correction circuit of the charging device; turning off, by the controller, the power factor correction circuit upon sensing overcurrent; increasing, by the controller, an output voltage of the power factor correction circuit when the number of generations of sensed overcurrent is equal to or less than a predetermined first reference value; and turning on, by the controller, the power factor correction circuit.

The increasing of the output voltage may include increasing the output voltage by a value obtained by multiplying the number of generations of overcurrent by a predetermined voltage command transformation constant. The method may further include stopping operation of the charging device in response to determining that the charging device has malfunctioned when the number of generations of overcurrent exceeds the predetermined first reference value, after the turning off of the power factor correction circuit.

Additionally, the method may include stopping operation of the charging device in response to determining that the charging device has malfunctioned or failed when the increased output voltage exceeds a predetermined limit voltage value, after the increasing of the output voltage. The method may further include: after the turning off of the power factor correction circuit, decreasing power of the power factor correction circuit when the number of generations of overcurrent exceeds the predetermined first reference value and is equal to or less than a predetermined second reference value greater than the first reference value; and turning on the power factor correction circuit.

The decreasing of the power may include decreasing input power of the power factor correction circuit by a value obtained by multiplying the number of generations of overcurrent by a predetermined input power command transformation constant. The decreasing of the power may further include decreasing output power of the power factor correction circuit by a value obtained by multiplying the number of generations of overcurrent by a predetermined output power command transformation constant.

Furthermore, the decreasing of the power may include decreasing input current of the power factor correction circuit by a value obtained by multiplying the number of generations of overcurrent by a predetermined input current command transformation constant to decrease the power and decreasing output current of the power factor correction circuit by a value obtained by multiplying the number of generations of overcurrent by a predetermined output current command transformation constant to decrease the power. The method may further include stopping operation of the charging device in response to determining that the charging device has malfunction or a failure is detected when the decreased power is less than a predetermined limit power value, after the decreasing of the power.

A method of controlling a charging device for vehicles, according to another exemplary embodiment of the present invention may include: sensing, by a controller, overcurrent in a power factor correction circuit of the charging device; turning off, by the controller, the power factor correction circuit upon sensing overcurrent; decreasing, by the controller, power of the power factor correction circuit when the number of generations of sensed overcurrent is equal to or less than a predetermined first reference value; and turning on, by the controller the power factor correction circuit. The method may further include stopping operation of the charging device in response to detecting a failure of the charging device when the decreased power is less than a predetermined limit power value, after the decreasing of the power.

Additionally, the method may include: after the turning off of the power factor correction circuit, increasing an output voltage of the power factor correction circuit when the number of generations of overcurrent exceeds the predetermined first reference value and is equal to or less than a predetermined second reference value greater than the first reference value; and turning on the power factor correction circuit. The method may further include stopping operation of the charging device in response to detecting a failure of the charging device when the increased output voltage exceeds a predetermined limit voltage value, after the increasing of the output voltage.

A system for controlling a charging device for vehicles, according to another exemplary embodiment of the present invention may include: a rechargeable battery; a vehicle charging device used for battery charging; a power factor correction circuit disposed within the vehicle charging device and configured to increase charging efficiency; and a controller configured to sense overcurrent in the power factor correction circuit, turn off the power factor correction circuit upon sensing overcurrent, and increase an output voltage of the power factor correction circuit and then turn on the power factor correction circuit when the number of generations of sensed overcurrent is equal to or less than a predetermined first reference value.

The controller may be configured to decrease power of the power factor correction circuit and then turn on the power factor correction circuit when the number of generations of sensed overcurrent exceeds the predetermined first reference value and is equal to or less than a predetermined second reference value greater than the first reference value. A charging device mounted within vehicles such as hybrid vehicles may be configured to a battery using AC voltage, and charging operation thereof may be stopped due to various types of failures according to AC power states of countries and areas in the world. Particularly, when an external power supply is used as an AC power supply, overcurrent may frequently be generated in a power factor correction circuit of the charging device. Accordingly, the present invention may be configured to determine generation of overcurrent in the power factor correction circuit case by case to minimize interruption of charging, thereby reducing user inconvenience due to interruption of charging.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

A description will be given of exemplary embodiments of the present invention with reference to the attached drawings.

Figure 1:
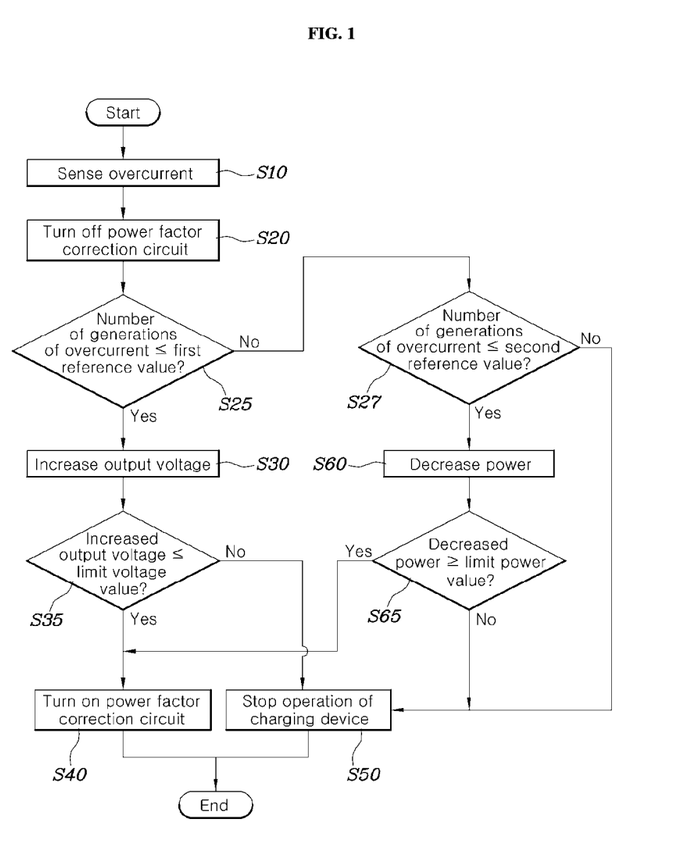
FIG. 1 is a flowchart illustrating a method of controlling a vehicle charging device according to an exemplary embodiment of the present invention.

A method of controlling a vehicle charging device 20 according to the present invention may include sensing, by a controller 30, overcurrent in a vehicle charging device power factor correction circuit 22 (S10) and turning off the power factor correction circuit 22 when the controller 30 senses overcurrent (S20), as shown in FIG. 1.

In the sensing of the overcurrent sensing S10, overcurrent generated in the power factor correction circuit 22 may be sensed using various methods. For example, the overcurrent may be sensed using a current sensor and when the sensed current exceeds a predetermined reference level an overcurrent may be detected. When overcurrent is sensed, a problem may be generated in the power factor correction circuit 22 due to the overcurrent and thus the controller 30 may be configured to turn off the power factor correction circuit 22 (S20). The turning off of the power factor compensation circuit 22 may be interpreted as cutting off a pulse width modulation (PWM) signal of the power factor correction circuit 22.

The power factor correction circuit 22 may include a plurality of transistors or metal-oxide-semiconductor (MOS) transistors and a signal for controlling on/off operations of the transistors or MOS transistors is a PWM signal applied to bases of the transistors or gates of the MOS transistors. Accordingly, execution of on/off of the power factor correction circuit 22 may be regarded as control of on/off of the PWM signal, and thus the power factor correction circuit off S20 in the present invention may be regarded as cutting off the PWM signal applied to the power factor correction circuit 22.

When the power factor correction circuit 22 is turned off in response to determining that overcurrent is generated, the charging device 20 may be operated based on the cause of generation of overcurrent. Accordingly, it is necessary to preliminarily understand the cause of generation of overcurrent. There may be multiple causes of generation of overcurrent in the power factor correction circuit having a voltage from an AC power supply 40 as an input.

For example, overcurrent may be generated when an AC voltage that corresponds to an input voltage of the power factor correction circuit 22 is greater than an output voltage of the power factor correction circuit 22. Since the power factor correction circuit circuit 22 operates in a boost mode, an output capacitor may be charged with voltage through a diode when the input voltage of the power factor correction circuit 22 increases to be greater than the output voltage thereof, and thus overcurrent may be generated. Additionally, overcurrent may be generated due to a problem caused by current control instability of the charging device 20. Alternately, overcurrent may be generated due to a problem caused by hardware failure of the power factor correction circuit 22.

Accordingly, the present invention proposes a method of using the number of generations of overcurrent to cope with the possible situations of overcurrent generation. In particular, overcurrent caused by the AC voltage greater than the output voltage of the power factor correction circuit 22 and AC control instability is less frequently generated than overcurrent caused by hardware failure since hardware failure causes overcurrent to be continuously generated irrespective of a control method.

Therefore, it may be possible to more easily differentiate a case in which the power factor correction circuit has hardware failure from a case in which the AC voltage is greater than the output voltage of the power factor correction circuit or AC control is unstable through the number of generations of overcurrent. In addition, the differentiation differentiation between a case in which the AC voltage is greater than the output voltage of the power factor correction circuit and a case in which AC control is unstable depends on which one of voltage controllability and current controllability of the charging device 20 is greater. Accordingly, the present invention may consider a case in which the AC voltage is is greater than the output voltage as less frequently generating overcurrent than a case in which AC control is unstable on the assumption that the charging device 20 has greater voltage controllability, and then may consider a case in which the AC voltage is greater than the output voltage as less frequently generating overcurrent than a case in which AC control is unstable on the assumption that the charging device 20 has greater current controllability.

When the charging device 20 having voltage controllability greater than current controllability is assumed, overcurrent caused by the AC voltage greater than the output voltage of the power factor correction circuit 22 may be generated least frequently. Accordingly, the present invention may be configured to determine overcurrent generated in the power factor correction circuit 22 as overcurrent caused by the AC voltage greater than the output voltage of the power factor correction circuit 22 when the number of generations of sensed overcurrent is equal to or less than a first reference value. Particularly, the first reference value may be set by the designer in various manners. The first reference value may be set to about 3 to 5.

Furthermore, there may be a high probability that overcurrent caused by AC control instability is more frequently generated than overcurrent caused by an instantaneous AC voltage increase over the output voltage of the power factor correction circuit 22. Accordingly, the present invention may be configured to determine overcurrent generated in the power factor correction circuit 22 as overcurrent caused by AC control instability when the number of generations of current exceeds the first reference value and is equal to or less than a second reference value greater than the first reference value. In particular, the second reference value may be a reference value of the number of generations of overcurrent for determining whether the power factor correction circuit 22 has hardware failure.

As described above, overcurrent caused by hardware failure cannot be solved by the controller 30, distinguished from the other two cases, and thus overcurrent may be continuously generated. Thus, the number of generations of overcurrent may be greater than those in the other two cases. Therefore, the second reference value may be set to be greater than the first reference value and, when the number of generations of overcurrent exceeds the second reference value, the controller 30 may be configured to determine overcurrent generated in the power factor correction circuit 22 as a hardware failure or malfunction in the power factor correction circuit 22. The second reference value may be set to various values by the designer as the first reference value.

In response to determining the cause of generation of overcurrent in the power factor correction circuit 22 using the first and second reference values, the charging device may be operated in response to the determination. When the cause of generation of overcurrent is determined to be that the AC voltage is greater than the output voltage of the power factor correction circuit 22, that is, when the number of generations of overcurrent is equal to or less than the first reference value, the output voltage may be increased (S30), as shown in FIG. 1.

A capacitor provided to the output terminal of the power factor correction circuit 22 may be prevented from being charged with voltage due to the AC voltage greater than the output voltage by increasing the output voltage. Accordingly, the present invention may be configured to remove overcurrent generated in the power factor correction circuit 22 by increasing the output voltage of the power factor correction circuit 22 through the output voltage increase S30. Specifically, the output voltage increase may be performed by increasing the output voltage by a value obtained by multiplying the number of generations of overcurrent by a predetermined voltage command transformation constant.

Figure 3:
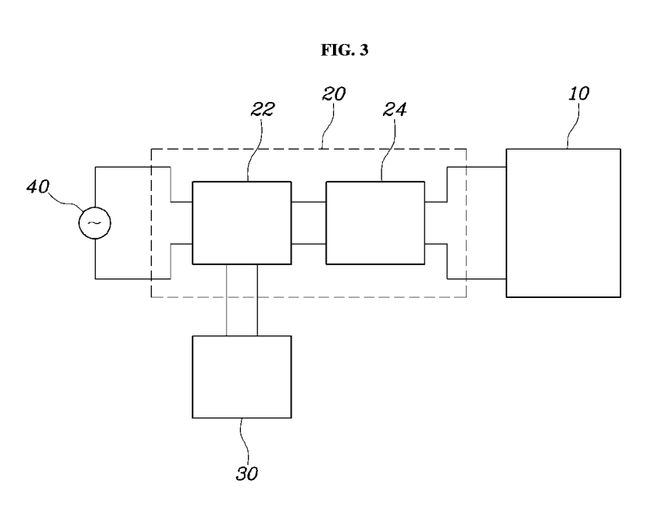
FIG. 3 is a block diagram of a system for controlling a vehicle charging device according to an exemplary embodiment of the present invention.

However, even when the output voltage of the power factor correction circuit 22 is increased, the output voltage of the power factor correction circuit 22 is not capable of being indefinitely increased. The power factor correction circuit 22 provided to the vehicle charging device 20 may be connected to a DC/DC converter 24, as shown in FIG. 3. Accordingly, the output voltage of the power factor correction circuit 22 may become an input voltage of the DC/DC converter 24 and the input voltage may be converted by the DC/DC converter 24 and supplied as a voltage for charging a battery 10. Therefore, an increase in the output voltage of the power factor correction circuit 22 may be permitted within a range in which the output voltage may be applied as the input voltage of the DC/DC converter 24. The present invention may be configured to set the allowable output output voltage of the power factor correction circuit 22 as a limit voltage value and compare the limit voltage value with the increased output voltage.

When the increased output voltage is less than the limit voltage value, the output voltage may be further increased, and thus the output voltage may be increased to solve the overcurrent problem and then the controller may be configured to turn on the power factor correction circuit 22 (S40) to prevent charging of the vehicle charging device 20 from being stopped. When the increased output voltage exceeds the limit voltage value, the output voltage may not be increased further (e.g., the increase may be stopped), and thus the controller 30 may be configured to stop operation of the vehicle charging device 20 in response to detecting a failure of the vehicle charging device 20 (S50), as shown in FIG. 1.

When the number of generations of overcurrent exceeds the first reference value and is equal to or less than the second reference value, overcurrent may be determined to be generated due to AC control instability, as described above. In particular, power of the power factor correction circuit 22 may be limited to improve AC control stability. The present invention proposes four methods as methods of limiting power of the power factor correction circuit 22.

In particular, the first method includes decreasing input power, the second method includes decreasing output power, the third method includes decreasing input current and the fourth method includes decreasing output current. The input or output power of the power factor correction circuit 22 may be directly limited through the methods of decreasing the input power and output power. The methods of decreasing the input current current and output current decrease power of the power factor correction circuit 22 by indirectly adjusting the input current and output current since the input voltage and the output voltage of the power factor correction circuit 22 may be fixed values and difficult to adjust.

The power of the power factor correction circuit 22 may be limited through any of the four methods, and thus AC control instability of the power factor correction circuit 22 may be improved. In each method, current or power may be decreased by a value obtained by multiplying the number of generations of sensed overcurrent by a current or power transformation constant, as in the aforementioned method of increasing the output voltage.

After a power decrease S60 is performed in the aforementioned manner, the controller may be configured to compare the decreased power with a limit power value (S65), as shown in FIG. 1, since the power is not capable of being indefinitely decreased, similarly to the aforementioned comparison of the increased output voltage with the limit voltage value.

Further, a power decrease refers to a decrease in the power output from the vehicle charging device 20, which indicates a decrease in charging efficiency of the battery 10. Accordingly, the power needs to be at a level that may maintain charging efficiency of the battery 10. Therefore, the present invention may be configured to set the power level as the limit power value, compare the decreased power with the limit power value and, when the decreased power exceeds the limit power value, remove overcurrent through power decrease and then turn on the power factor correction circuit (S40) to control vehicle charging not to be stopped (e.g., to continue vehicle charging) since battery charging efficiency standards are satisfied.

When the decreased power is less than the limit power value, the battery charging efficiency standards may not be satisfied and thus, further power decrease may be unnecessary. Accordingly, operation of the vehicle charging device 20 may stopped (S50) (S50) by stopping operation of the charging device 20, as shown in FIG. 1. When the number of generations of overcurrent exceeds the second reference value, generated overcurrent may be determined to be caused by hardware failure of the vehicle charging device 20, as described above. In particular, the charging device stopping process may be be directly performed without additional control, as shown in FIG. 1, to stop operation of the vehicle charging device 20.

Figure 2:
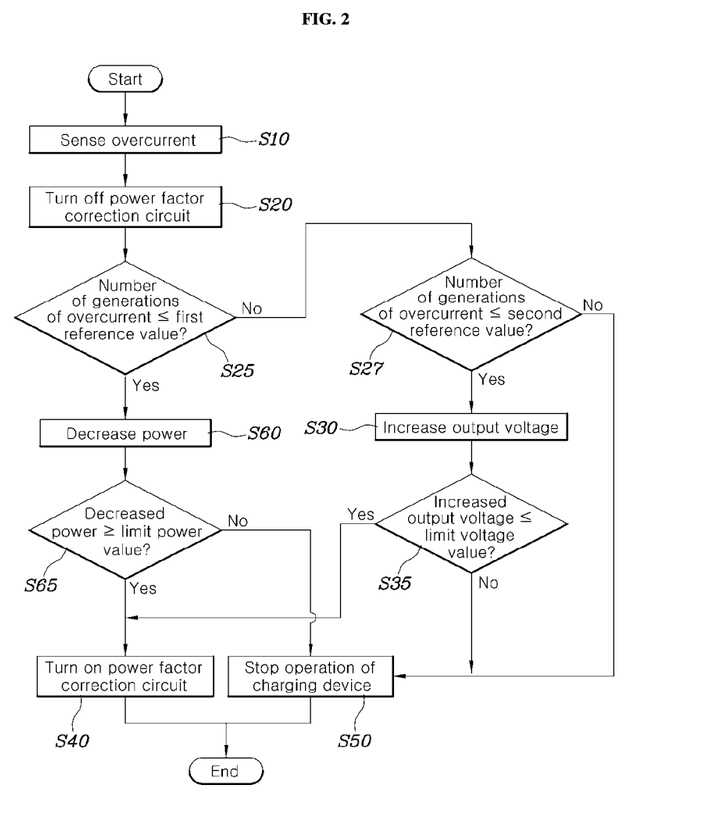
FIG. 2 is a flowchart illustrating a method of controlling a vehicle charging device according to an exemplary embodiment of the present invention.

In the above description, the charging device 20 may be assumed to have voltage controllability greater than current controllability. In the following description, the charging device 20 may be assumed to have current controllability greater than voltage controllability. A method of controlling the vehicle charging device is shown in FIG. 2 in this case. While the control method illustrated in FIG. 2 is similar to the aforementioned control method, the number of generations of overcurrent caused by AC control instability may be smallest when current controllability is greater than voltage controllability, as shown from comparison between FIG. 1 and FIG. 2, and thus power may be decreased when the number of generations of overcurrent is equal to or less than the first reference value, and the output voltage may be increased in response to determining that overcurrent is generated due to the AC voltage greater than the output voltage of the power factor correction circuit 22 when the number of generations of overcurrent is equal to or less than the predetermined second reference value greater than the first reference value.

As shown in FIG. 3, a system for controlling a vehicle charging device according to the present invention may include the rechargeable battery 10, the vehicle charging device used for charging the battery 10, the power factor correction circuit 22 provided to the vehicle charging device 20 to increase charging efficiency, and the controller 30 configured to sense overcurrent in the power factor correction circuit 22, turn off the power factor correction circuit 22 in response to sensing overcurrent, increase the output voltage of the power factor correction circuit 22 and then turn on the power factor correction circuit 22 when the number of generations of sensed overcurrent is equal to or less than the predetermined first reference value. The controller 30 may be configured to decrease the power of the power factor correction circuit 22 and then turn on the power factor correction circuit 22 when the number of generations of sensed overcurrent exceeds the predetermined first reference value and is equal to or less than the predetermined second reference value greater than the first reference value.

The system for controlling the vehicle charging device 20 having controllability greater than current controllability has been described. When the charging device 20 has current controllability greater than voltage controllability, the controller 30 of the system may be configured to sense overcurrent generated in the power factor correction circuit 22, turn off the power factor correction circuit 22 upon sensing overcurrent, decrease the power of the power factor correction circuit 22 and then turn on the power factor correction circuit 22 when the number of generations of sensed overcurrent is equal to or less than the predetermined first reference value, and increase the output voltage of the power factor correction circuit 22 and then turn on the power factor correction circuit 22 when the number of generations of sensed overcurrent exceeds the predetermined first reference value and is equal to or less than the predetermined second reference value greater than the first reference value.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method of controlling a charging device for vehicles, comprising:
   sensing, by a controller, overcurrent in a power factor correction circuit of the charging device;
   turning off, by the controller, the power factor correction circuit upon sensing overcurrent after the sensing;
   increasing, by the controller, an output voltage of the power factor correction circuit when the number of generations of sensed overcurrent is equal to or less than a predetermined first reference value;
   turning on, by the controller, the power factor correction circuit after the increasing;
   after the turning off of the power factor correction circuit, decreasing, by the controller, power of the power factor correction circuit when the number of generations of overcurrent exceeds the predetermined first reference value and is equal to or less than a predetermined second reference value greater than the first reference value; and
   turning on, by the controller, the power factor correction circuit.

2. The method according to claim 1, wherein the increasing of the output voltage includes increasing, by the controller, the output voltage by a value obtained by multiplying the number of generations of overcurrent by a predetermined voltage command transformation constant.

3. The method according to claim 1, further comprising:
   stopping, by the controller, operation of the charging device in response to detecting a failure of the charging device when the number of generations of overcurrent exceeds the predetermined first reference value, after the turning off of the power factor correction circuit.

4. The method according to claim 1, further comprising:
   stopping, by the controller, operation of the charging device in response to detecting a failure of the charging device when the increased output voltage exceeds a predetermined limit voltage value, after increasing of the output voltage.

5. The method according to claim 1, wherein the decreasing of the power includes decreasing, by the controller, input power of the power factor correction circuit by a value obtained by multiplying the number of generations of overcurrent by a predetermined input power command transformation constant.

6. The method according to claim 1, wherein the decreasing of the power includes decreasing, by the controller, output power of the power factor correction circuit by a value obtained by multiplying the number of generations of overcurrent by a predetermined output power command transformation constant.

7. The method according to claim 1, wherein the decreasing of the power includes decreasing, by the controller, input current of the power factor correction circuit by a value obtained by multiplying the number of generations of overcurrent by a predetermined input current command transformation constant to decrease the power.

8. The method according to claim 1, wherein the decreasing of the power includes decreasing, by the controller, output current of the power factor correction circuit by a value obtained by multiplying the number of generations of overcurrent by a predetermined output current command transformation constant to decrease the power.

9. The method according to claim 1, further comprising:
   stopping, by the controller, operation of the charging device in response to detecting a failure of the charging device when the decreased power is less than a predetermined limit power value, after the decreasing of the power.

10. A method of controlling a charging device for vehicles, comprising:
    sensing, by a controller, overcurrent in a power factor correction circuit of the charging device;
    turning off, by the controller, the power factor correction circuit upon sensing overcurrent, after the sensing;
    decreasing, by the controller, power of the power factor correction circuit when the number of generations of sensed overcurrent is equal to or less than a predetermined first reference value;
    turning on, by the controller, the power factor correction circuit after the decreasing;
    after turning off of the power factor correction circuit, increasing, by the controller, an output voltage of the power factor correction circuit when the number of generations of overcurrent exceeds the predetermined first reference value and is equal to or less than a predetermined second reference value greater than the first reference value; and
    turning on, by the controller, the power factor correction circuit.

11. The method according to claim 10, further comprising:
    stopping, by the controller, operation of the charging device in response to detecting a failure of the charging device when the decreased power is less than a predetermined limit power value, after the decreasing of the power.

12. The method according to claim 10, further comprising:
    stopping, by the controller, operation of the charging device in response to detecting a failure of the charging device when the increased output voltage exceeds a predetermined limit voltage value, after increasing of the output voltage.

13. A system for controlling a charging device for vehicles, comprising:
    a rechargeable battery;
    a vehicle charging device used for battery charging;
    a power factor correction circuit mounted within the vehicle charging device to increase charging efficiency; and
    a controller configured to sense overcurrent in the power factor correction circuit, turn off the power factor correction circuit in response to sensing overcurrent, and increase an output voltage of the power factor correction circuit and then turn on the power factor correction circuit when the number of generations of sensed overcurrent is equal to or less than a predetermined first reference value, wherein the controller is configured to decrease power of the power factor correction circuit and turn on the power factor correction circuit when the number of generations of sensed overcurrent exceeds the predetermined first reference value and is equal to or less than a predetermined second reference value greater than the first reference value.

14. A system for controlling a charging device for vehicles, comprising:
a rechargeable battery;
a vehicle charging device used for battery charging;
a power factor correction circuit mounted within the vehicle charging device to increase charging efficiency; and
a controller configured to sense overcurrent in the power factor correction circuit, turn off the power factor correction circuit in response to sensing overcurrent, and decrease power of the power factor correction circuit and then turn on the power factor correction circuit when the number of generations of sensed overcurrent is equal to or less than a predetermined first reference value, wherein the controller is configured to increase an output voltage of the power factor correction circuit and turn on the power factor correction circuit when the number of generations of sensed overcurrent exceeds the predetermined first reference value and is equal to or less than a predetermined second reference value greater than the first reference value.

* * * * *